United States Patent [19]
Park et al.

[11] Patent Number: 5,954,286
[45] Date of Patent: Sep. 21, 1999

[54] MECHANISM FOR MOVING A REEL ASSEMBLY AND A TAPE CASSETTE SENSING SWITCH IN A MAGNETIC RECORDER

[75] Inventors: Lae-soo Park; Chang-woo Lee, both of Kyonggi-do, Rep. of Korea

[73] Assignee: Samsung Electronics Co., Ltd., Kyungki-do, Rep. of Korea

[21] Appl. No.: 09/023,205

[22] Filed: Feb. 13, 1998

[30] Foreign Application Priority Data

Feb. 14, 1997 [KR]  Rep. of Korea ...................... 97-4502

[51] Int. Cl.⁶ .................................................. G03B 23/02
[52] U.S. Cl. ............................................ 242/336; 242/345
[58] Field of Search .................................. 242/345, 336, 242/340, 342; 360/93, 94

[56] References Cited

U.S. PATENT DOCUMENTS

| | | | |
|---|---|---|---|
| 4,490,757 | 12/1984 | Mogi | 242/336 X |
| 4,664,337 | 5/1987 | Shiratori | 242/336 |
| 4,787,572 | 11/1988 | Rademacher | 242/336 |
| 4,984,109 | 1/1991 | Yokoo | 242/336 X |
| 5,082,195 | 1/1992 | Saito et al. | 242/336 |
| 5,669,569 | 9/1997 | Lee | 242/336 X |
| 5,692,695 | 12/1997 | Park | 242/336 |
| 5,794,873 | 8/1998 | Hamaguchi | 242/336 |
| 5,813,621 | 9/1998 | Eum | 242/336 |

FOREIGN PATENT DOCUMENTS 8-167198  6/1996  Japan .............................. G11B 15/22

*Primary Examiner*—Donald P. Walsh
*Assistant Examiner*—William A. Rivera
*Attorney, Agent, or Firm*—Sughrue, Mion, Zinn, Macpeak & Seas, PLLC

[57] ABSTRACT

A mechanism to move reels and a tape cassette sensing switch, for use in a magnetic recorder which includes: a power generating unit installed on a position of a main chassis; a moving member combined with a bottom surface of the main chassis in such a manner that the moving member can be rectilinearly moved back and forth; a power transmitting unit for transmitting power from the power generating unit to the moving member; a supply reel driver and a take up reel driver respectively installed on the bottom surface of the main chassis in spaced apart relation from each other; reel driving gears respectively combined with and fixed to rotary shafts of the supply and the take up reel drivers; and a reel supporting unit concentrically combined with the reel driving gears on the main chassis and including thereon a supply reel and a take up reel. The reel supporting unit is rotated by a predetermined angle according to the rectilinear movements of the moving member.

32 Claims, 8 Drawing Sheets

MECHANISM FOR MOVING A REEL ASSEMBLY AND A TAPE CASSETTE SENSING SWITCH IN A MAGNETIC RECORDER

BACKGROUND OF THE INVENTION

1. Field of the Invention

The present invention relates to a mechanism for moving a reel assembly, and a tape cassette sensing switch, for use in a magnetic recorder capable of using two different sized tape cassettes, such as one for a video cassette recorder (VCR), one for a camcorder, one for a digital-video cassette recorder (D-VCR) and the like. More particularly the present invention relates to a simplified mechanism for moving a reel assembly, and a tape cassette sensing switch in a magnetic recorder, capable of reducing fabricating cost and enhancing reliability and performance of the recorder.

2. Description of the Related Art

With the recent enhancement of performance and functions of magnetic recorders such as VCR, D-VCR and the like, various kinds of tape cassettes for use in the magnetic recorders have been provided according to various user preferences. The tape cassettes are formed of various different materials, perform recording jobs in different manners, are fabricated by different methods, and have a record protecting function. Also, the sizes of the tape cassettes vary.

In addition, with the improvement of technology in the magnetic recorder industry, a technology for selectively using different sized tape cassettes in a single magnetic recorder is being attempted.

As a prerequisite to selectively using different sized tape cassettes in a magnetic recorder, a reel driving mechanism must be movably structured to accommodate the different sized tape cassettes.

There have been disclosed various techniques for accommodating different sized tape cassettes in a magnetic recorder by structuring a reel driving mechanism that is movable in a predetermined direction.

As an example, Japanese Patent Laid-open No. 8-167198 (1996) discloses a reel disk braking mechanism including: (1) a pair of reel disk bases for moving a pair of reel disks installed in such a manner that the distance between the reel disk bases can be adjusted to a distance corresponding to the distance between reels of a first cassette when the first cassette is used, and a distance corresponding to the distance between reels of a second cassette when the second cassette is used; (2) brake arms supported by respective shafts installed on the reel disk bases; (3) brake pads installed on respective ends of each of the brake arms; and (4) a pair of slide cams. The pair of reel disk bases are capable of bringing the brake pads in contact with respective reel disks, or separating the brake pads from the respective reel disks at any position corresponding to the distance between the reels of the first and the second cassettes.

However, in such a conventional technique, brake assemblies are loaded on respective reel disk bases. Accordingly, a great amount of power is required for moving the reel disk bases. Moreover, necessary structure for the great amount of power transmission, as well as interference between the brake assemblies and other adjacent components, must be taken into consideration. This results in a complicated structure and an increased cost.

In addition, reliability of performance may be reduced because the relatively complicated and heavy brake assemblies are loaded on the reel disk bases when moved.

Furthermore, the magnetic recorder utilizing two different sized tape cassettes requires a tape cassette sensing device for recognizing information on the characteristics of the tape cassettes. However, such a tape cassette sensing device is not included in the conventional technique. Accordingly, a tape cassette sensing device may be separately structured and a power source for driving the tape cassette sensing device is required. This results in a more complicated structure.

SUMMARY OF THE INVENTION

It is therefore an object of the present invention to provide a simplified mechanism for moving reels and a tape cassette sensing switch, for use in a magnetic recorder, capable of reducing fabricating cost and enhancing the reliability and performance of the magnetic recorder.

It is another object of the present invention to provide a simplified mechanism for moving reels and a tape cassette sensing switch, for use in a magnetic recorder, wherein the tape cassette sensing switch is moved in association with movements of the reels.

According to the present invention, a mechanism for moving reels and a tape cassette sensing switch, for use in a magnetic recorder, comprises: a power generating unit installed on a main chassis; a moving member combined with a bottom surface of the main chassis in such a manner that the moving member can be rectilinearly moved back and forth; a power transmitting unit for transmitting power from the power generating unit to the moving member; a supply reel driver and a take up reel driver fixed at predetermined respective positions on the bottom surface of the train chassis, reel driving gears connected with and fixed to respective rotary shafts of the reel drivers; and a reel supporting member including a supply reel and a take up reel which are meshed with the reel driving gears on the main chassis and on which two different sized tape cassettes can be installed, the reel supporting member is rotated by a predetermined angle associated with the rectilinear movements of the moving member.

Preferably, the power generating unit includes a driving motor that is fixed in an upright manner at a corner portion of a top surface of the main chassis.

The power transmitting unit includes: a worm gear rod for transmitting power from the driving motor; and at least one driving gear that is rotated by rotational power of the worm gear rod.

A rack is fixed to the moving member, and a last driving gear of the driving rears is meshed with the rack.

The moving member includes first guide slots. First guide pins fixed to the main chassis are inserted into respective first guide slots. Accordingly, the movements of the moving member are guided by the first guide slots and the first guide pins. Interlocking members are combined with the moving member in such a manner that the interlocking members can be rectilinearly moved back and forth. The interlocking members are elastically supported, in a predetermined position, by an elastic member. In addition, second guide pins are fixed to the interlocking members. The moving member includes second guide slots for insertion of the second guide pins. Accordingly, the movements of the interlocking members are guided by the second guide pins and the second guide slots in the same manner as the moving member.

Preferably, each elastic member is a torsion spring one end of which is supported by the moving member and another end of which is supported by a respective interlocking member.

In addition, the reel supporting member includes a through hole that is concentric with respect to an axis of rotation of a respective reel driving gear and also includes a plurality of arc slots. A plurality of guide pins are fixed to the main chassis along traces of the arc slots. Accordingly, the reel supporting member is rotated through a predetermined angle along the guide pins. Combining pins are connected to respective interlocking members and respective reel supporting members. Thus, each reel supporting member is rotated by the movements of a respective interlocking member.

In addition, preferably, a tape cassette sensing switch moving portion, having an MIC switch for sensing various information of a selected tape cassette, is operated in association with the movements of the moving member.

The tape cassette sensing switch moving portion includes: a connecting unit installed on a predetermined position of the moving member; a first operating member rotatably connected to a predetermined portion of a bottom surface of the main chassis adjacent to the connecting unit; a second operating member rotatably connected to a predetermined portion of a top surface of the main chassis and opposed to the first operating member so that the second operating member is moved in association with the first operating member; and a slider including an MIC switch thereon and rectilinearly moved back and forth by rotational movements of the second operating member along a slant slot formed on the main chassis.

A first connecting pin connected to the connecting unit is fixed to a predetermined position of the first operating member and a second connecting pin connected to the second operating member is fixed in another position on the first operating member.

Preferably, the second operating member includes third and fourth guide slots formed in a direction corresponding to the length thereof. The second connecting pin of the first operating member is inserted into the third guide slot through the arc slot formed in the main chassis. Accordingly, the second operating member is rotated by rotation of the first operating member and the guide pins of the first operating member are guided by the arc slots formed on the main chassis.

In addition, third and fourth guide pins are fixed to the bottom surface of the slider. The third and the fourth guide pins are inserted into a slant slot of the main chassis. The third side pin is inserted into the slant slot of the main chassis through the fourth guide blot of the second operating member. Accordingly, the slider is rectilinearly moved back and forth along the slant slot by the rotational movements of the second operating member.

The connecting unit includes a couple of connecting members, i.e., a first and a second connecting member and an elastic member. The first and the second connecting members are hinged to a corner portion of the moving member in such a manner that a space for location of the first connecting pin of the first operating member is formed between the first and the second connecting members. The first connecting member is connected to the second connecting member by the elastic member.

Preferably, the elastic member is a tension coil spring, the ends of which are respectively fixed to the first and the second connecting members.

In addition, stopping portions are formed on the first and the second connecting members. The stopping portions are stopped against stopping projections, formed integrally within the main chassis, to selectively prevent rotation of the connecting members.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

The mechanism for moving reels and a tape cassette sensing switch according to the present invention will be hereinafter described in detail, referring to the accompanying drawings. For purposes of description, elements having basically the same function are identified using common reference numbers throughout the drawings.

Figure 1:
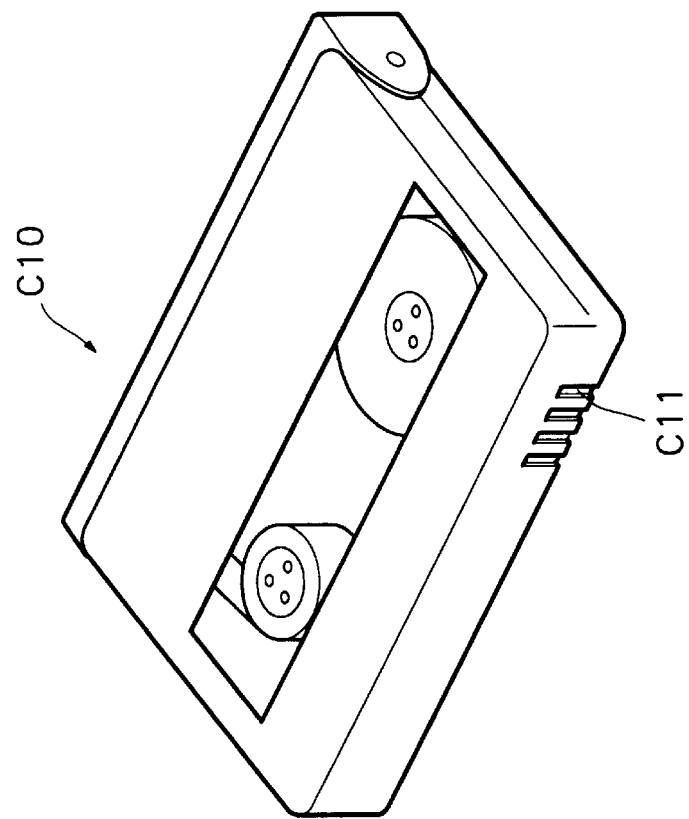
FIG. 1 is a perspective view of two different sized tape cassettes and an MIC switch as used in a magnetic recorder according to the present invention.
Figure 1:
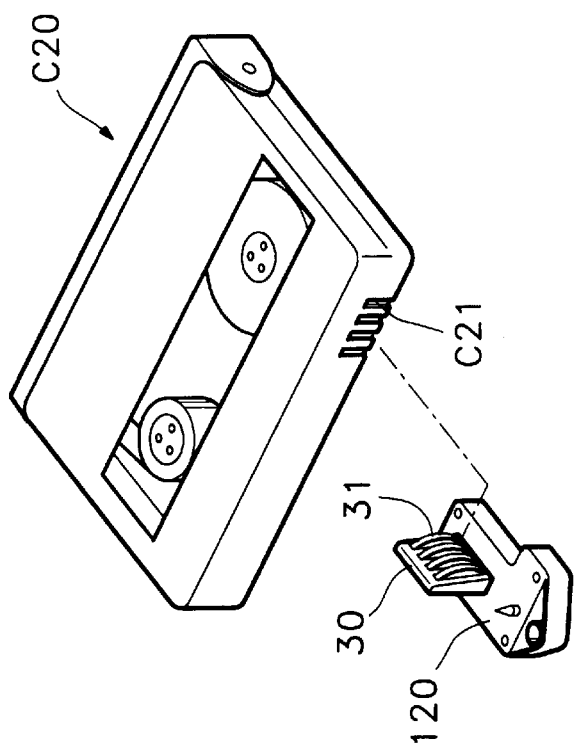

According to the structure and the operation, the mechanism for moving reels and a tape cassette sensing switch according to the present invention may be mainly divided into: a reel moving portion for moving a supply reel 10 and a take up reel 20 to respective positions according to the size of the tape cassette used, for example a relatively large tape cassette (i.e., a standard tape cassette C10), and a relatively small tape cassette C20 shown in FIG. 1; and a tape cassette sensing switch moving portion moved in association with the reel moving portion, for moving a memory in cassette (MIC) switch 30 to a predetermined position to sense various information such as material, recording method, record protecting technology, and the like of a selected tape cassette C10 or C20.

It is a feature of the present invention that an operation for moving the supply reel 10 and the take up reel 20 according to the type of tape cassette C10 or C20 is carried out at the same time that the MIC switch is moved.

First, the reel moving portion of the mechanism for moving reels and a tape cassette sensing switch according to the present invention will be described.

Figure 3:
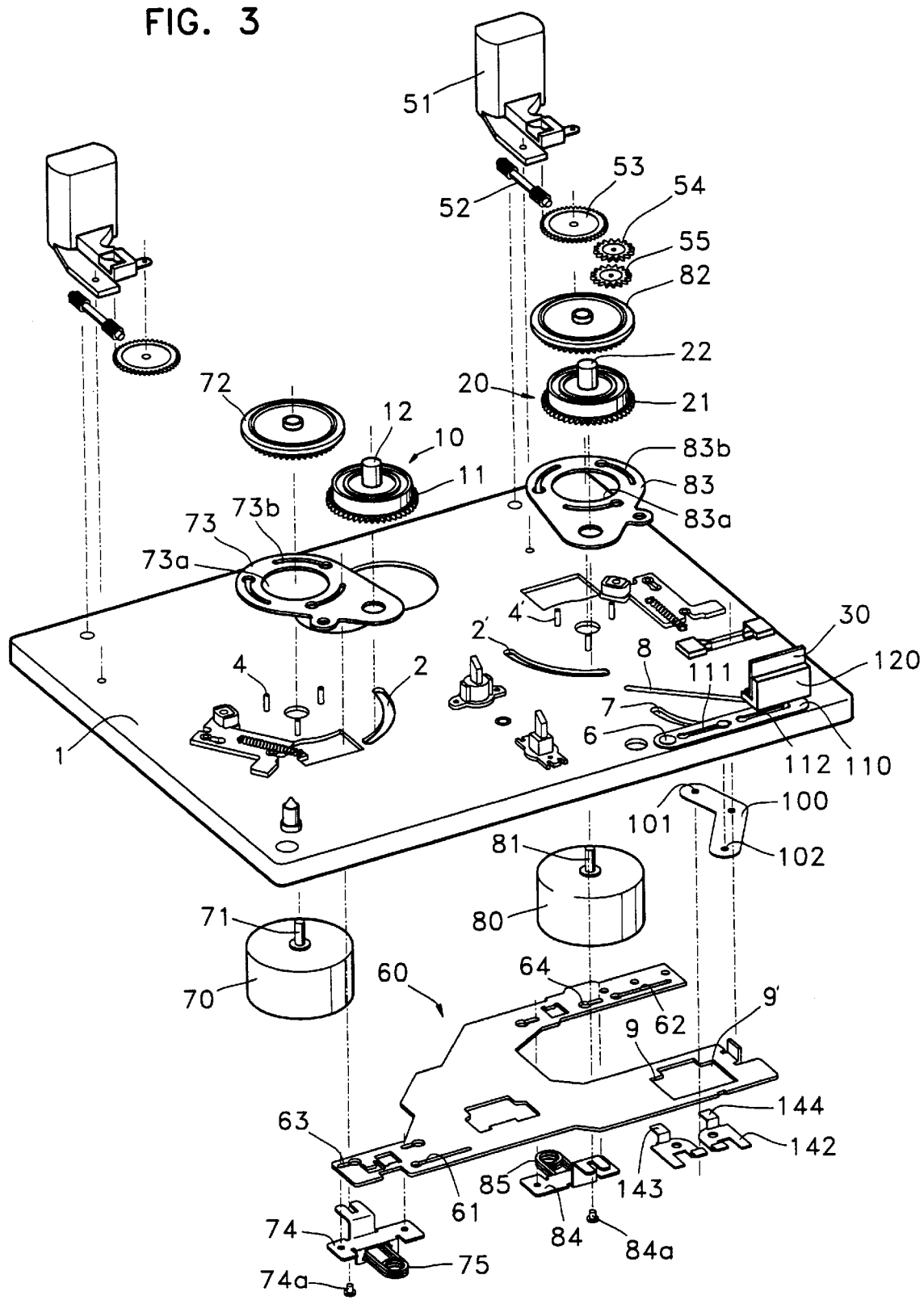
FIG. 3 is an exploded perspective view of a mechanism for moving reels and a tape cassette sensing switch according to the present invention.

Referring to FIG. 3, the reel moving portion includes: a driving motor 51 that is fixed in an upright manner at a right upper corner of a main chassis 1 (alternatively the motor can be mounted on the upper left corner of the chassis); a worm gear rod 52 rotated by power from the driving motor 51; a first driving gear 53 rotated by rotation of the worm gear rod 52; a second driving gear 54 rotated by rotation of the first driving gear 53; a third driving gear 55 that is rotatably supported at a predetermined position of a bottom surface of the main chassis 1 and is meshed with the second driving gear 54; a moving plate 60 that is rectilinearly moved back and forth under the main chassis 1 (when the motor is mounted in the upper left corner of the chassis, the moving plate must be the mirror image of that shown in FIG. 3 wherein the mirror is in a plane coincident with the left side edge of the chassis, thus completing a reversal of the parts); a rack 56 that is fixed at a predetermined position of the moving plate 60 and meshed with the third driving gear 55; a supply reel motor 70 and a take up reel motor 80 that are respectively fixed to the bottom surface of the main chassis 1 in spaced apart relation from each other by a predetermined distance, respective rotation shafts 71 and 81 of the supply reel motor 70 and the take up reel motor 80 protruding out of a top surface of the main chassis 1; reel driving gears 72 and 82 that are connected with and fixed to respective rotation shafts 71 and 81 of the supply reel motor 70 and the take up reel motor 80; reel brackets 73 and 83 that include through holes 73a and 83a which are concentric with respective reel driving gears 72 and 82 are located between the main chassis 1 and the driving gears 72 and 82; a supply reel 10 and a take up reel 20 are installed on the reel brackets 73 and 83, respectively; interlocking members 74 and 84 movably connected to predetermined portions of the moving plate 60, for rotating the reel brackets 73 and 83 in a clockwise direction or in a counter-clockwise direction according to movements of the moving plate 60; elastic members 75 and 85 such as torsion springs, for elastically supporting the interlocking members 74 and 84.

The supply reel 10 and the take up reel 20 respectively include reel gears 11 and 21 that are meshed with reel driving gears 72 and 82. Central shafts 12 and 22 of the supply reel 10 and the take up reel 20 are respectively inserted into arc guide slots 2 and 2' formed on the main chassis 1 so that rotations of the reel brackets 73 and 83 are supported.

The moving plate 60 includes first guide slots 61 and 62. The first guide slots 61 and 62 are fitted with first guide pins 3 and 3' fixed to the bottom surface of the main chassis 1, so that the moving plate 60 can be rectilinearly moved back and forth with guidance of the first guide slots 61 and 62 and the first guide pins 3 and 3'.

The reel brackets 73 and 83 respectively include through holes 73a and 83a at center portions thereof for passages of the rotation shafts 71 and 81 of the supply reel motor 70 and the take up reel motor 80. A plurality of arc slots 73b and 83b are respectively formed around circumferences of the through holes 73a and 83a. The plurality of arc slots 73b and 83b are fitted with a plurality of guide pins 4 and 4' formed on the main chassis 1. Accordingly, the reel brackets 73 and 63 can be rotated through predetermined angles by guidance of the arc slots 73b and 83b and the guide pins 4 and 4'. Combining pins 76 and 86 connected to the interlocking members 74 and 84 are fixed to the bottom surface of the reel brackets 73 and 83.

The interlocking members 74 and 84 can be rectilinearly moved back and forth with guidance of a plurality of second guide pins 74a and 84a fixed to the interlocking members 74 and 84 and a plurality of second guide slots 63 and 64 formed on the moving plate 60. Elastic members 75 and 85 are respectively inserted moving plate 60.

Now, the tape cassette tensing switch moving portion of the mechanism for moving reels and a tape cassette sensing switch according to the present invention will be described.

Referring again to FIG. 3, the tape cassette sensing switch moving portion includes: a connecting unit installed on a predetermined portion of the moving plate 60; a first operating member 100 rotatable connected to a portion of the bottom surface of the main chassis 1, adjacent to the connecting unit, by a shaft pin 5; a second operating member 110 rotatable mounted to a portion of the top surface of the main chassis 1, opposed to the first operating member 100, by a shaft pin 6 and accordingly operated in association with the first operating member 100; and a slider 120 including an MIC switch 30 thereon and rectilinearly moved back and forth along a slant slot 8, formed from a predetermined corner portion of the main chassis 1 to a center portion of the main chassis 1, by a rotational movement of the second operating member 110.

The first operating member 100 is connected with the connecting unit by a first connecting pin 101 and connected with the second operating member 110 by a second connecting pin 102.

The second operating member 110 includes a third guide slot 111 and a fourth guide slot 112 formed in the direction corresponding to the length thereof. The second connecting pin 102 of the first operating member 100 is inserted into the third guide slot 111 through an arc slot 7 formed on the main chassis 1. Accordingly, when the second operating member 110 is rotated by a rotational movement of the first operating member 100, the second connecting pin 102 of the first operating member 100 is guided by the arc slot 7 formed on the main chassis 1.

Figure 6:
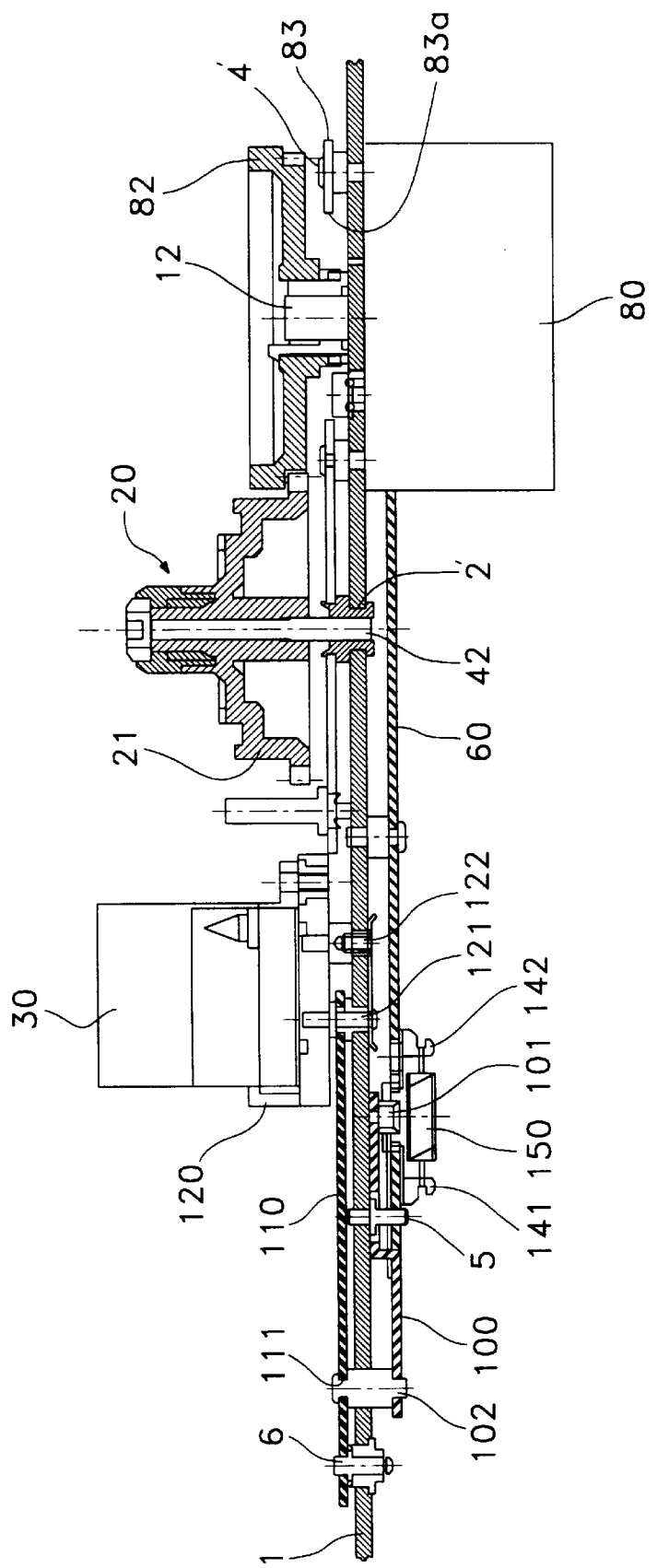
FIG. 6 is a cross sectional view of a reel motor, an MIC switch, a moving plate and adjacent components of a mechanism for moving reels and a tape cassette sensing switch according to the present invention.
Figure 7:
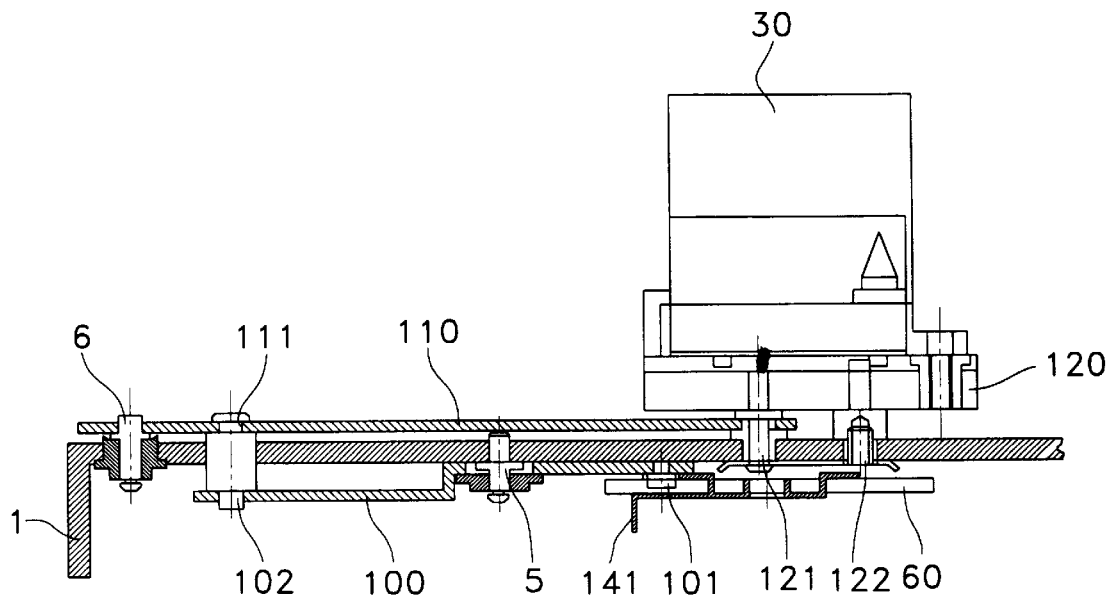
FIG. 7 is a cross sectional view of an MIC switch moving unit of a mechanism for moving reels and a tape cassette sensing switch according to the present invention.
Figure 9:
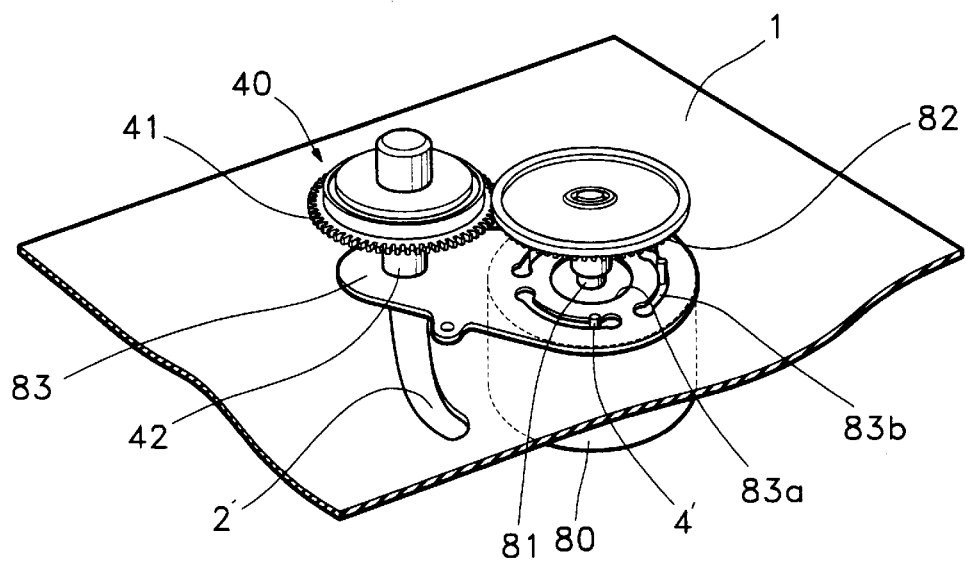
FIG. 9 is a perspective view of a reel motor, a reel assembly and adjacent components of a mechanism for moving reels and a tape cassette sensing switch according to the present invention.
Figure 8:
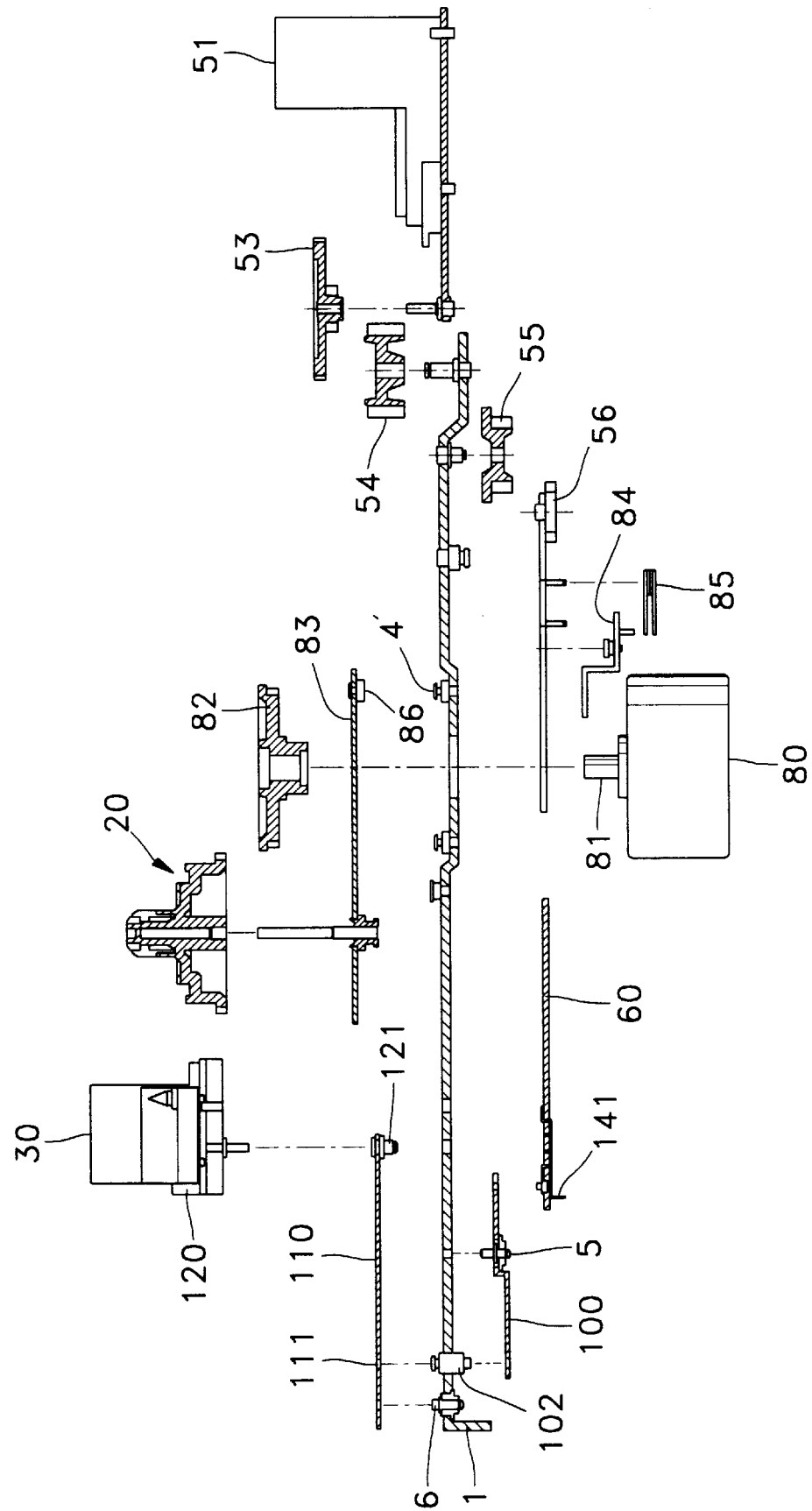
FIG. 8 is an exploded cross sectional view illustrating FIGS. 6 and 7 in detail.

In addition, first and second guide pins 121 and 122 are fixed to the bottom surface of the slider 120 as shown in FIG. 6. The first and the second guide pins 121 and 122 are inserted into the slant slot 8 of the main chassis 1. The first guide pin 121 is inserted into the slant slot 8 through the second guide slot 112 of the second operating member 110. Accordingly, when the second operating member 110 is rotated, the slider 120 is rectilinearly moved back and forth along the slant slot 8, guided thereby.

The MIC switch 30 functions to read data related to tape materials, recording methods, record protecting technologies and the like of the tape cassettes. As shown in FIG. 1, the MIC switch includes a plurality of movable terminals 31 and each of the tape cassettes i.e., the standard tape cassette C10 and the small tape cassette C20, include a plurality of external terminals C11 and C21 to contact with the movable terminals 31 of the MIC switch 30.

Figure 10:
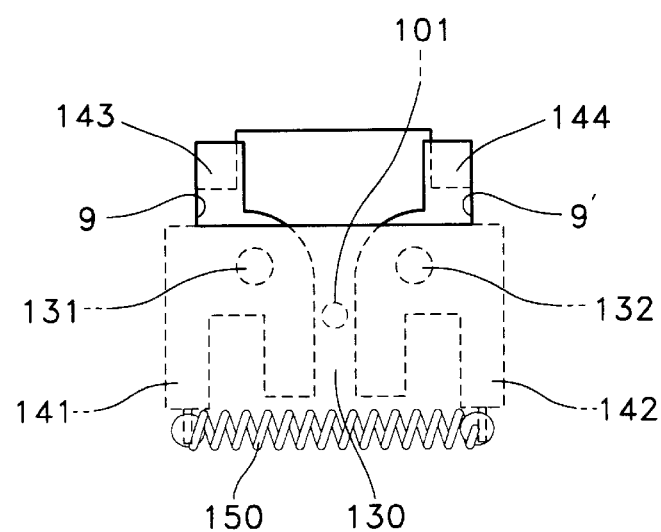
FIG. 10 is a top view of an embodiment of a connecting unit for connecting a reel moving portion to a tape cassette sensing switch moving portion of a mechanism for moving reels and a tape cassette sensing switch according to the present invention.

Referring to FIG. 10, the connecting unit includes a couple of connecting members, i.e., a first connecting member 141 and a second connecting member 142, and an elastic member 150 such as a tension coil spring. The first and the second connecting members 141 and 142 are hinged to a corner portion of the moving plate 60 by respective hinging members 131 and 132 in such a manner that a space 130 for location of the first connecting pin 101 of the first operating member 100 is formed between the first and the second connecting members 141 and 142. The first connecting member 141 is connected to the second connecting member 142 by the elastic member 150.

Rotational power is imparted to the first and the second connecting members 141 and 142 in clockwise and counter-clockwise directions by the elastic member 150. Stopping portions 143 and 144 on the first and the second connecting members 141 and 142 abut against stopping projections 9 and 9' formed on the moving plate 60 to selectively prevent rotation of the connecting members.

The operation of the mechanism for moving reels and a tape cassette sensing switch, for use in a magnetic recorder, according to the present invention will be described hereinafter.

Figure 2:
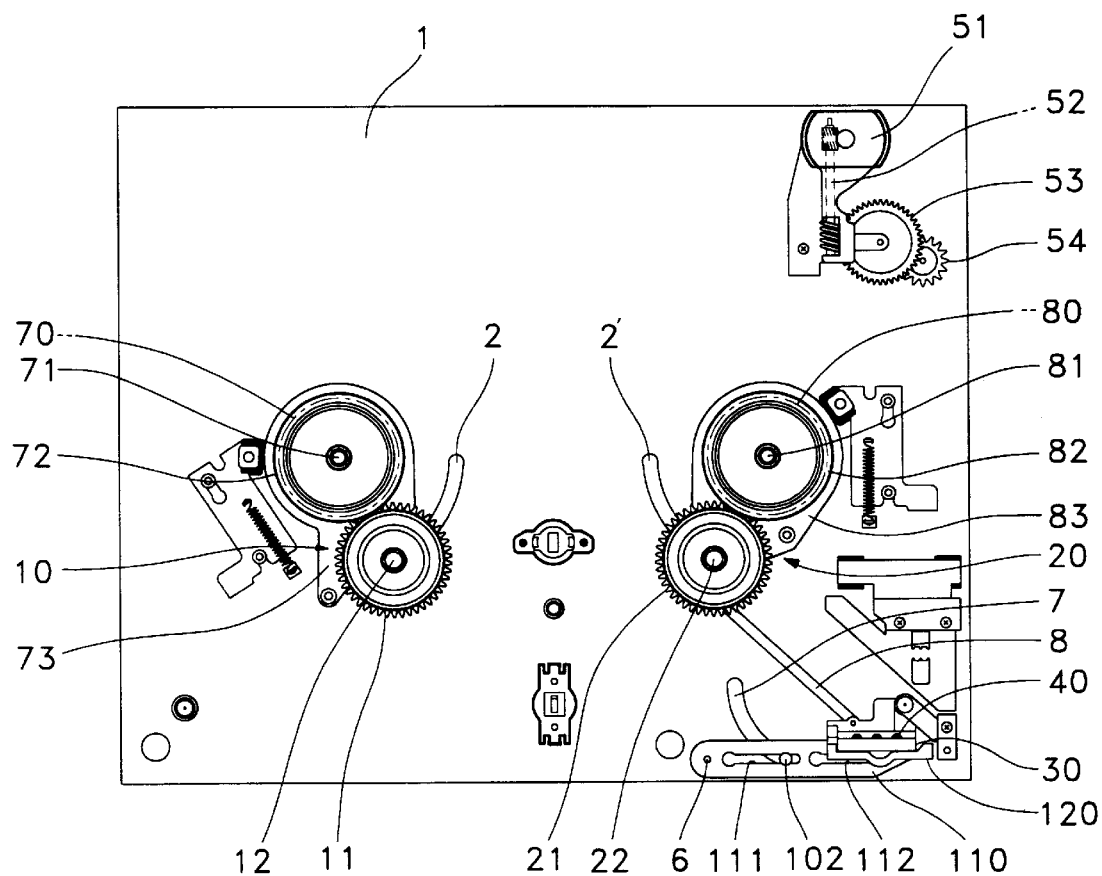
FIG. 2 is a top view of a magnetic recorder deck including a mechanism for moving reels and a tape cassette sensing switch according to the present invention.
Figure 4:
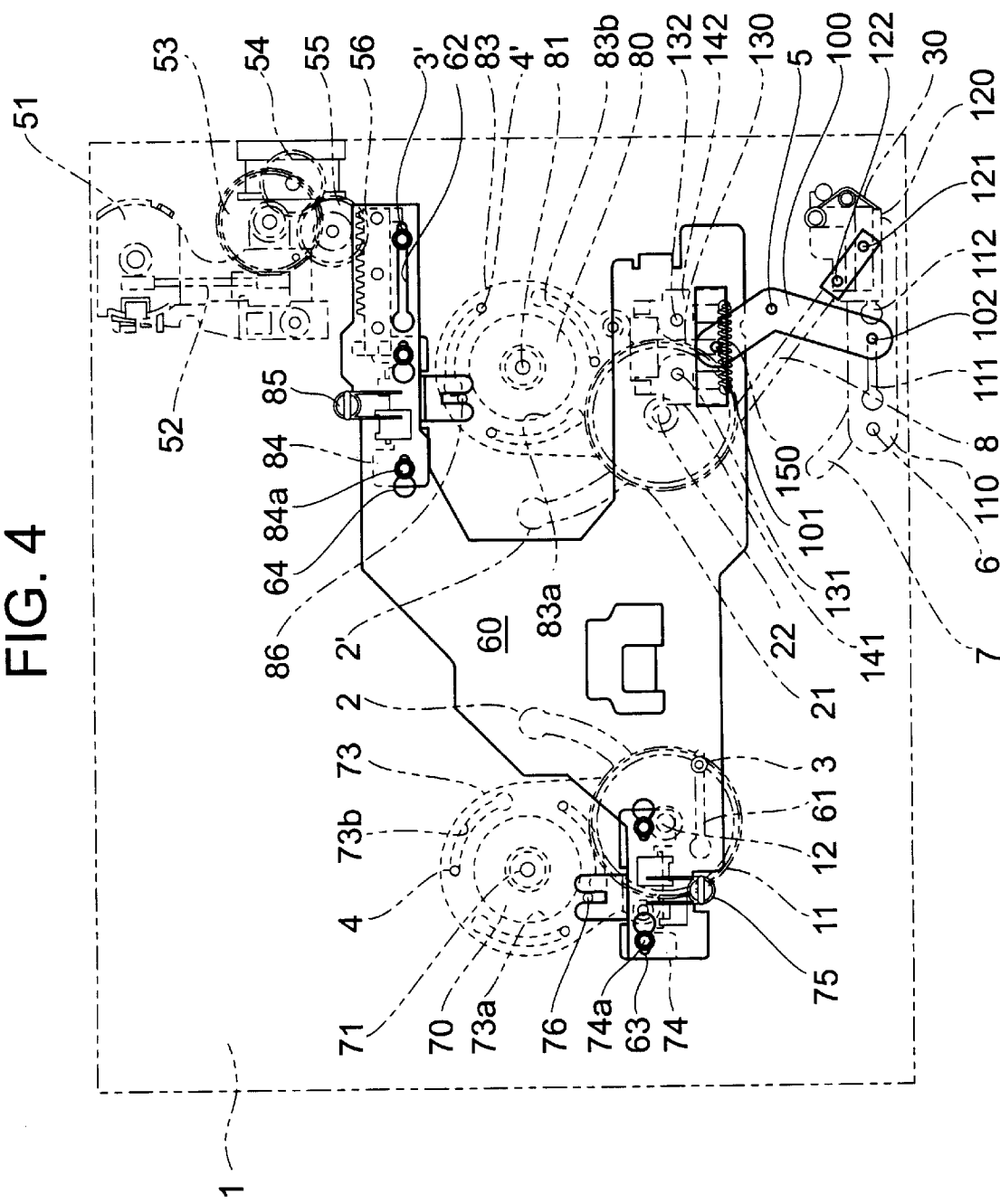
FIG. 4 is a bottom view of a mechanism for moving reels and a tape cassette sensing switch according to the present invention when a relatively large tape cassette is used.
Figure 5:
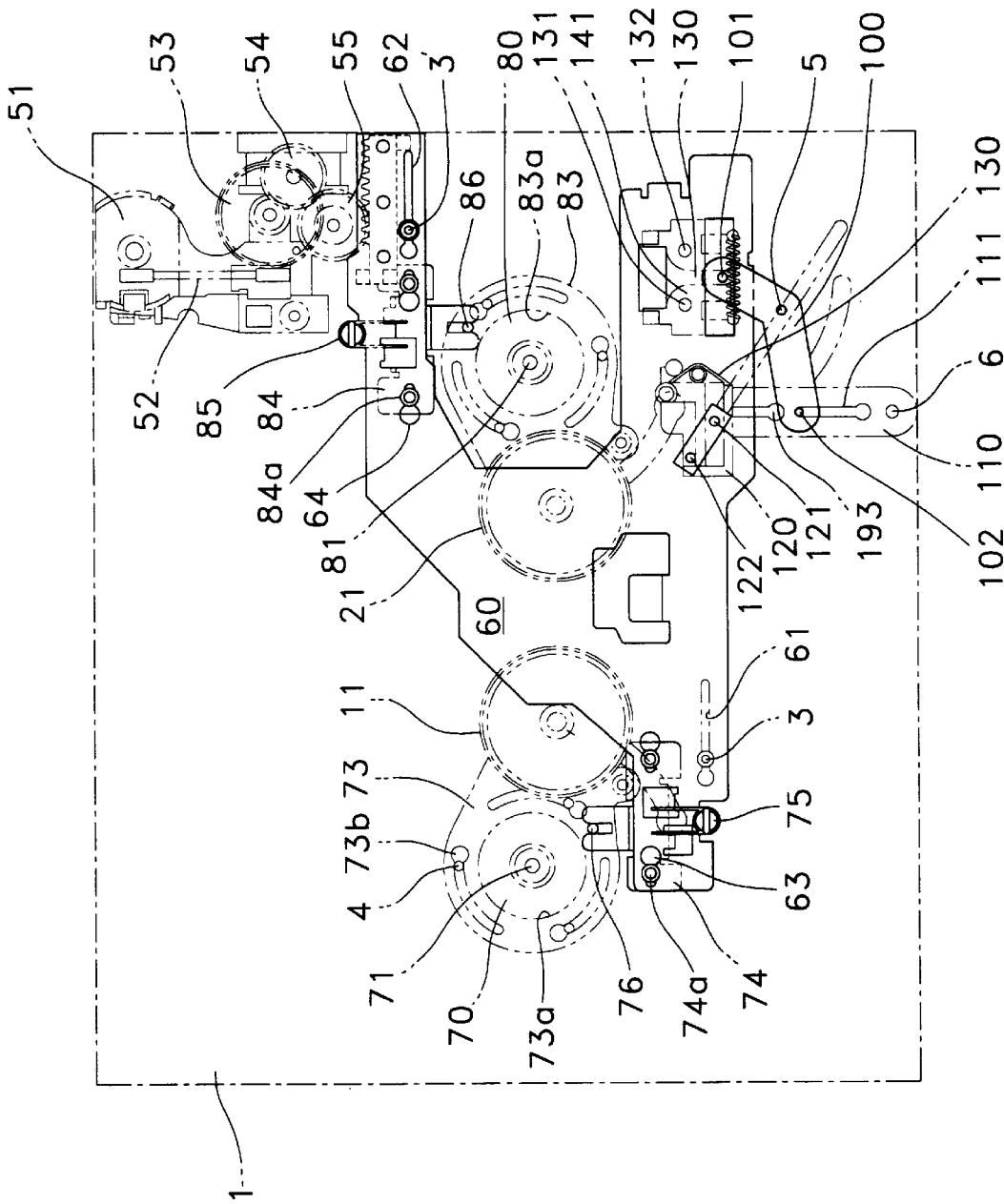
FIG. 5 is a bottom view of a mechanism for moving reels and a tape cassette sensing switch according to the present invention when a relatively small tape cassette is used.

When the standard tape cassette C10 shown in FIG. 1 is used, as shown in FIGS. 2 and 4, the distance between the supply reel 10 and the take up reel 20 is wide, and at the same time the MIC switch 30 is located near the corner of the main chassis 1. When the small tape cassette C20 shown in FIG. 1 is used, as shown in FIG. 5, the distance between the supply reel 10 and the take up reel 20 is narrower, and the MIC switch 30 is located near the center of the main chassis 1. These two cases will be described in detail hereinafter.

As shown in FIG. 4, when the standard tape cassette C10 is used, operational power from the driving motor 51 is transmitted through the worm gear rod 52, the first driving gear 53, the second driving gear 54, the third driving gear 55 and the rack 56, successively. As a result, the moving plate 60 is rectilinearly moved from right to left in the drawing.

At this time, since the moving plate 60 is combined with the interlocking members 74 and 84, and the interlocking members 74 and 84 are connected to the reel brackets 73 and 83 by the combining pins 76 and 86, a distance between the reel brackets 73 and 83 is widened.

When the distance between the reel brackets 73 and 83 is widened, the distance between the supply reel 10 and the take up reel 20 installed on the reel brackets 73 and 83 is accordingly widened and adjusted into the distance between reels of the standard tape cassette C10.

By the movement of the supply reel 10 and the take up reel 20 in association with the movement of the moving plate 60, the MIC switch 30 is also adjusted to the location of the standard tape cassette C10.

In other words, because the first connecting pin 101 of the first operating member 100 is inserted into the space 130 of the first and the second connecting members 141 and 142 which are in turn supported by a portion of the moving plate 60, the first operating member 100 is rotated about the shaft pin 5 in a counter-clockwise direction according to the direction of movement of the moving plate 60. By the rotation of the first operating member 100, the second operating member 110 is rotated about the shaft pin 6 in a clockwise direction.

Therefore, the slider 120 of the MIC switch 30 combined with the second operating member 110 is moved along the slant slot 8 of the main chassis 1. At the corner of the main chassis 1, the movable terminals 31 of the MIC switch 30 contact the external terminals C11 of the standard tape cassette C10.

On the other hand, as shown in FIG. 5, when a small tape cassette C20 is used, the reverse operational power from the driving motor 51 is successively transmitted though the worm gear rod 52, the first driving gear 53, the second driving gear 54, the third driving gear 55 and the rack 56. As a result, the moving plate 60 is rectilinearly moved from left to right in the drawing.

By the movements of the moving plate 60, the distance between the reel brackets 73 and 83 is narrowed. Accordingly, the locations of the supply reel 10 and the take up reel 20 are adjusted to the location of the small tape cassette C20.

At the same time, the first operating member 100 is rotated about the shaft pin 5 in a clockwise direction. According to the rotations of the first operating member 100, the second operating member 110 is rotated about the shaft pin 6 in a counter-clockwise direction.

Therefore, the slider 120 of the MIC switch 30 combined with the second operating member 110 is moved along the slant slot 8 toward the center of the main chassis 1. The movable terminals 31 of the MIC switch 30 contact the external terminals C21 of the small tape cassette C20.

At this time, the moving plate 60 is moved slightly more to right in the drawing by the operational power from the driving motor 51. Accordingly, the interlocking members 74 and 84 supported by the moving plate 60 are moved in the same direction. By the movements of the interlocking members 74 and 84, the elastic members 75 and 85 supporting the interlocking members 74 and 84 are pushed. Then, the elasticity of the elastic members 75 and 85 simultaneously influences the reel brackets 73 and 83 connected to respective interlocking members 74 and 84 through the combining pins 76 and 86. As a result, the reel brackets 73 and 83 are elastically and stably supported.

In addition, the first and the second connecting members 141 and 142 are influenced by rotational power in a clockwise direction and a counter-clockwise direction by the elastic member 150 and, at the same time, the first and the second connecting members 141 and 142 are stopped by the stopping portions 9 and 9' formed within the moving plate 60, to prevent further rotation. Accordingly, when the moving plate 60 is repeatedly moved back and forth, the first operating member 100 including a first connecting pin 101 located at the space 130 between the first and the second connecting members 141 and 142 is more stably rotated which results in enhanced reliability.

As aforementioned, the mechanism for moving reels and a tape cassette sensing switch, for use in a magnetic recorder, according to the present invention includes: a power generating unit installed on a position of a main chassis; a moving member combined with a bottom surface of the main chassis in such a manner that the moving member can be rectilinearly moved back and forth; a power transmitting unit for transmitting power from the power generating unit to the moving member; a supply reel driver and a take up reel driver each fixed to the bottom surface of the main chassis; reel driving gears connected with and fixed to respective rotary shafts of the supply reel driver and the take up reel driver; and a reel supporting member including a supply reel and a take up reel which are meshed with the reel driving gears on the main chassis and on which two different sized tape cassettes can be installed. The reel supporting member is rotated through predetermined angles by associated rectilinear movements of the moving member. This arrangement results in reduced cost, enhanced reliability of the operation, and enhanced performance by simplifying the mechanism for moving reels and a tape cassette sensing switch as described above. Furthermore, according to the present invention, the whole structure is simplified by structuring the reel to move in association with the movements of the tape cassette sensing switch.

The mechanism for moving reels and a tape cassette sensing switch, for use in a magnetic recorder, according to the present invention have been described above with reference to the aforementioned embodiments. It is evident, however, that many alternative, modifications and variations will be apparent to those skilled in the art in light of the foregoing description. Accordingly, the present invention embraces all such alternatives, modifications and variations as fall within the spirit and scope of the appended claims.

What I claim is:

1. A mechanism for moving reels and a tape cassette sensing switch, for use in a magnetic recorder, comprising:

a main chassis having a top surface and a bottom surface;

power generating means installed on a predetermined position of said main chassis;

a moving member combined with said bottom surface in such a manner that said moving member can be rectilinearly moved back and forth;

power transmitting means for transmitting power from said power generating means to said moving member;

a supply reel driver and a take up reel driver fixed to said bottom surface, wherein said supply reel driver and said take up reel driver each include a rotary shaft and are spaced apart from each other;

reel driving gears respectively connected with said rotary shafts of said supply reel driver and said take up reel driver; and a reel supporting member including a supply reel and a take up reel which are meshed with said reel driving gears and on which two different sized tape cassettes can be installed, wherein said reel supporting member is configured to rotate through a predetermined angle in accordance with said rectilinear movements of said moving member.

2. The mechanism for moving reels and a tape cassette sensing switch according to claim 1, wherein said power generating means comprises a driving motor fixed in an upright manner to a predetermined corner of said main chassis.

3. The mechanism for moving reels and a tape cassette sensing switch according to claim 2, wherein said power transmitting means comprises:

a worm gear rod for transmitting operational power of said driving motor; and a gear train including at least one driving gear rotated by said worm gear rod.

4. The mechanism for moving reels and a tape cassette sensing switch according to claim 3, wherein a rack is fixed to a predetermined position of said moving member, and a final driving gear of said gear train is meshed with said rack.

5. The mechanism for moving reels and a tape cassette sensing switch according to claim 4, wherein first guide slots are formed on said moving member and first guide pins, formed on said main chassis, are respectively inserted into said first guide slots, so that the movement of said moving member is guided by said first guide pins.

6. The mechanism for moving reels and a tape cassette sensing switch according to claim 5, wherein interlocking members are connected with predetermined portions of said moving member in such a manner that said interlocking members can be rectilinearly moved back and forth, and said interlocking members are elastically supported in a predetermined position by respective elastic members.

7. The mechanism for moving reels and a tape cassette sensing switch according to claim 6, wherein second guide pins are fixed to said interlocking members, and second guide slots for insertion of said second guide pins are formed on said moving member so that said interlocking members are moved along said second guide slots.

8. The mechanism for moving reels and a tape cassette sensing switch according to claim 6, wherein each of said elastic members includes a torsion spring, one end of each torsion spring is supported by said moving member and another end of each torsion spring is supported by one of said interlocking members.

9. The mechanism for moving reels and a tape cassette sensing switch according to claim 6, wherein said reel supporting member further comprises a pair of reel brackets, wherein each reel bracket includes a plurality of arc slots, the rotational movement of each reel bracket through a predetermined angle is guided by a plurality of guide pins fixed to said main chassis along traces of said arc slots.

10. The mechanism for moving reels and a tape cassette sensing switch according to claim 9, further comprising combining pins wherein each combining pin is connected to one of said interlocking members and is fixed to one of said reel brackets such that each of said reel brackets are rotated in association with movement of said interlocking members.

11. The mechanism for moving reels and a tape cassette sensing switch according to claim 1, further comprising a tape cassette sensing switch moving portion, having a memory in cassette switch for sensing various data of a selected tape cassette, which is moved in association with movements of said moving member.

12. The mechanism for moving reels and a tape cassette sensing switch according to claim 11, wherein said main chassis includes a slant slot and said tape cassette sensing switch moving portion comprises:

connecting means installed on said moving member;

a first operating member rotatably connected to a portion of the bottom surface of said main chassis which is adjacent to said connecting means;

a second operating member rotatably connected to a portion of the top surface of said main chassis which is opposed to said first operating member so that said second operating member is positioned to move in association with said first operating member; and a slider having said memory in cassette switch installed on a top surface thereof is positioned to rectilinearly move back and forth along said slant slot in accordance with rotational movement of said second operating member.

13. The mechanism for moving reels and a tape cassette sensing switch according to claim 12, wherein said first operating member includes a first connecting pin fixed to a portion thereof and connected to said connecting means, and a second connecting pin fixed to another portion thereof and connected to said second operating member.

14. The mechanism for moving reels and a tape cassette sensing switch according to claim 13, wherein:

said main chassis includes an arc slot formed therein;

said second operating member includes a first guide slot and a second guide slot extending in a direction along the length thereof; and said second connecting pin of said first operating member is inserted into said second guide slot through said arc slot, such that said second operating member is rotated by rotation of said first operating member which is guided by contact of said second connecting pin of said first operating member with said arc slot.

15. The mechanism for moving reels and a tape cassette sensing switch according to claim 14, wherein a third and a fourth guide pin are fixed to a bottom surface of said slider and are inserted into said slant slot, wherein said third guide pin is inserted into said slant slot through said second guide slot such that said slider is configured to be rectilinearly moved back and forth by the contact of said third and forth guide pins with said slant slot in accordance with rotation of said second operating member.

16. The mechanism for moving reels and a tape cassette sensing switch according to claim 13, wherein said connecting means comprises:

a first and a second connecting member respectively hinged on a corner portion of said moving member by hinging members in such a manner that a space for locating the first connecting pin of said first operating member is formed between said first and said second connecting members; and an elastic member connecting said first connecting member to said second connecting member.

17. The mechanism for moving reels and a tape cassette sensing switch according to claim 16, wherein said elastic member is a tension coil spring ends, of which are respectively fixed to ends of said first and said second connecting members.

18. The mechanism for moving reels and a tape cassette sensing switch according to claim 16, further comprising a stopping portion on each of said first and said second connecting members and stopping projections formed on said main chassis, wherein said stopping projections are configured to prevent rotation of said first and second connecting members when contacted by said stopping portions.

19. The mechanism for moving reels and a tape cassette sensing switch according to claim 12, wherein a third and a fourth guide pin are fixed to a bottom surface of said slider and are inserted into said slant slot, wherein said third guide pin is inserted into said slant slot through said second guide slot such that said slider is configured to be rectilinearly moved back and forth by the contact of said third and forth guide pins with said slant slot in accordance with rotation of said second operating member.

20. The mechanism for moving reels and a tape cassette sensing switch according to claim 1, wherein said reel supporting member further comprises a pair of reel brackets, wherein each reel bracket includes a plurality of arc slots, the rotational movement of each reel bracket through a predetermined angle is guided by a plurality of guide pins fixed to said main chassis along traces of said arc slots.

21. The mechanism for moving reels and a tape cassette sensing switch according to claim 20, further comprising combining pins wherein each combining pin is fixed to one of said reel brackets and extends through said chassis.

22. The mechanism for moving reels and a tape cassette sensing switch according to claim 21, wherein each of said combining pins is connected to said moving member.

23. A mechanism for moving reels and a tape cassette sensing switch, for use in a magnetic recorder, comprising:

a main chassis having a top surface and a bottom surface;

a motor installed on a predetermined position of said main chassis;

a moving member combined with said bottom surface in such a manner that said moving member can be rectilinearly moved back and forth;

a gear train for transmitting power from said motor to said moving member;

a supply reel driver and a take up reel driver fixed relative to said chassis, wherein said supply reel driver and said take up reel driver each include a rotary shaft and are spaced apart from each other;

reel driving gears respectively connected with said rotary shafts of said supply reel driver and said take up reel driver; and a reel supporting member including a supply reel and a take up reel which are meshed with said reel driving gears and on which two different sized tape cassettes can be installed, wherein said reel supporting member is configured to rotate through a predetermined angle in accordance with said rectilinear movements of said moving member.

24. The mechanism for moving reels and a tape cassette sensing switch according to claim 23, wherein said gear train includes:

a worm gear for transmitting operational power of said motor; and at least one driving gear rotated by said worm gear.

25. The mechanism for moving reels and a tape cassette sensing switch according to claim 24, wherein a rack is fixed to a predetermined position of said moving member, and a final driving gear of said gear train is meshed with said rack.

26. The mechanism for moving reels and a tape cassette sensing switch according to claim 23, further comprising a tape cassette sensing switch moving portion, having a memory in cassette switch for sensing various data of a selected tape cassette, which is moved in association with movements of said moving member.

27. The mechanism for moving reels and a tape cassette sensing switch according to claim 26, wherein said main chassis includes a slant slot and said tape cassette sensing switch moving portion comprises:

a connecting member installed on said moving member;

a first operating member rotatably connected to a portion of the bottom surface of said main chassis which is adjacent to said connecting member;

a second operating member rotatably connected to a portion of the top surface of said main chassis which is opposed to said first operating member so that said second operating member is positioned to move in association with said first operating member; and a slider having said memory in cassette switch installed on a top surface thereof, wherein said slider is positioned to rectilinearly move back and forth along said slant slot in accordance with rotational movement of said second operating member.

28. The mechanism for moving reels and a tape cassette sensing switch according to claim 27, wherein said first operating member includes a first connecting pin fixed to a portion thereof and connected to said connecting member, and a second connecting pin fixed to another portion thereof and connected to said second operating member.

29. The mechanism for moving reels and a tape cassette sensing switch according to claim 28, wherein said connecting member comprises:

a first and a second connecting member respectively hinged on a corner portion of said moving member by hinging members in such a manner that a space for locating the first connecting pin of said first operating member is formed between said first and said second connecting members; and an elastic member connecting said first connecting member to said second connecting member.

30. The mechanism for moving reels and a tape cassette sensing switch according to claim 23, wherein said reel supporting member further comprises a pair of reel brackets, wherein each reel bracket includes a plurality of arc slots, the rotational movement of each reel bracket through a predetermined angle is guided by a plurality of guide pins fixed to said main chassis along traces of said arc slots.

31. The mechanism for moving reels and a tape cassette sensing switch according to claim 30, further comprising combining pins wherein each combining pin is fixed to one of said reel brackets and extends through said chassis.

32. The mechanism for moving reels and a tape cassette sensing switch according to claim 31, wherein each of said combining pins is connected to said moving member.

* * * * *